(12) United States Patent
Pennello

(10) Patent No.: US 6,178,547 B1
(45) Date of Patent: Jan. 23, 2001

(54) METHOD AND APPARATUS FOR GENERATING NON-REDUNDANT SYMBOLIC DEBUG INFORMATION IN COMPUTER PROGRAMS

(75) Inventor: Tom Pennello, Santa Cruz, CA (US)

(73) Assignee: Metaware Incorporated, Santa Cruz, CA (US)

( * ) Notice: Under 35 U.S.C. 154(b), the term of this patent shall be extended for 0 days.

(21) Appl. No.: 08/080,156

(22) Filed: Jun. 17, 1993

(51) Int. Cl.[7] .................................................. G06F 9/44
(52) U.S. Cl. ......................................... 717/4; 717/5
(58) Field of Search .......................... 395/700; 717/3, 717/4, 5, 10; 714/25

(56) References Cited

U.S. PATENT DOCUMENTS

| | | |
|---|---|---|
| 4,595,981 | 6/1986 | Leung . |
| 4,636,940 | 1/1987 | Goodwin, Jr. . |
| 4,734,854 | 3/1988 | Afshar . |
| 4,953,084 | 8/1990 | Meloy et al. . |
| 5,021,948 | 6/1991 | Nakayama et al. . |
| 5,038,348 | 8/1991 | Yoda et al. . |
| 5,124,989 | 6/1992 | Padawer et al. . |

*Primary Examiner*—Dennis M. Butler
(74) *Attorney, Agent, or Firm*—LaRiviere, Grubman & Payne, LLP

(57) ABSTRACT

A single copy of symbolic debug information is generated and given a name. The name is derived from the name of the High Level Language construct for which symbolic debug information must be generated. All references to the symbolic debug information are through that name. Standard linker technology is used to connect the references to the single named copy. How to identify a single source module to contain particular symbolic debug information is also disclosed.

6 Claims, 3 Drawing Sheets

Removal of redundant SDI approach:

Non-generation of redundant SDI approach:

METHOD AND APPARATUS FOR GENERATING NON-REDUNDANT SYMBOLIC DEBUG INFORMATION IN COMPUTER PROGRAMS

TECHNICAL FIELD

The present invention relates to digital computers and computer programs and, more particularly, to reducing the generation of redundant information in computer programs.

BACKGROUND OF THE INVENTION

New programs created by a computer programmer often include one or more inadvertent errors. Locating and removing the errors in a program is generally known in the industry as "debugging" the program, the program errors being referred to as "bugs".

Debugging a program can be difficult and time-consuming. In the prior art of debugging a program, a programmer may first read the program line-by-line to try to locate the errors. Following the flow of a program by reading it line-by-line is difficult, even in a relatively simple program. If the program contains many loops, subroutines based on variables, or calls, the programmer may not be able to trace the sequence of execution, and hence the function of each line.

Computer programs are generally written in a high level programming language. This high level language, often referred to as source code, is translated by a compiler program into an assembly language. The binary form of the assembly language, called object code, is the form of the code actually executed by the computer.

Code debuggers are programs which aid a programmer in finding errors in code. They are extremely useful tools for improving the efficiency of the code debugging process.

One form of tool for debugging computer programs is disclosed in U.S. Pat. No. 4,636,940. It is pointed out that in many development situations, there may be bugs in both the hardware and the software. To simplify the debugging process, a logic analyzer is provided that can continually adjust during run time the "real" absolute trace specification to match the symbolic one entered by the user. It also can properly insert source symbols into the trace listing, even though the trace pertains to a program whose position in memory was determined dynamically at run time.

U.S. Pat. No. 5,021,948 points out that it is difficult to correlate a computer program statement number with a program statement, and that it is difficult to recognize program control structure and program flow because of loops, and the like. That patent discloses displaying a program counter mark showing program flow and control structure in correspondence with the program list.

U.S. Pat. No. 4,734,854 teaches that a software system may consist of several modules, each performing a specific task. That patent also discloses that commonly used software modules may be designed and developed only once, and reused many times in different applications with different operational contexts and requirements.

U.S. Pat. No. 4,595,981 discloses a method for testing interfaces between computer program modules. The individual cause/effect charts of each of the modules are used to test the interfaces between the modules by executing the test cases in the charts in such manner that each test case need only be executed once. The variables passed between modules are monitored and compared with the input conditions in the charts.

U.S. Pat. No. 5,038,348 discloses apparatus for debugging a data flow program. That patent points out that some computers do not operate on the principle of successive execution of instructions by the program counter. Instead, execution of an instruction is permitted as soon as all the data for calculation are prepared. The patent discloses a debugging apparatus for effectively carrying out debugging of a data flow program which can be executed in a data flow type information processing apparatus.

U.S. Pat. No. 4,953,084 discloses a source level debugger. When a programmer writes this program in a high level language, he does not want to search for the appearance of bugs or programming errors in the assembly code. To avoid these problems, debugger programs are provided that allow a programmer to debug his program with reference to the level of code in which he originally wrote the program. Such a debugger program is called a source-level debugger. Since the computer operates on object code, a source-level debugger needs to know where user resources named in the source code are actually stored by the computer during operation so that when a user requests the current value for a user resource, the debugging program knows where to find the user resource. This patent teaches the use of variable ranges to support symbolic debugging of optimized code. A debug symbol table is constructed which include descriptions of each user resource in source code. Additionally, a range table is constructed containing a list of ranges and a description of where the user resource may be found during each range.

U.S. Pat. No. 5,124,989 was issued to Microsoft Corporation for a method of debugging a computer program. That patent refers to a prior art product sold under the tradename Codeview. The patent discloses an improvement over the Microsoft Codeview debugger. The patent teaches storing a record of all debug commands executed on a program to facilitate locating and ensuing correction of errors in the program. The patent also teaches repeated identical execution of a sequence of debug commands on a program to observe the program response, both before and after modifying the program.

Despite all of the prior art patents such as the representative ones listed above, there is still a need for improvements in the field of debugging computer programs. A long standing problem with symbolic debuggers is the size of symbolic debug information.

Compilers supply symbolic debuggers with information needed to allow high level language inquiries. For example, the data type of each variable and function is part of this information. This information is referred to as "symbolic debug information" or just "SDI".

The size of SDI can get large enough to make a noticeable impact on the size of a program and the speed of a debugger. The debugger is slowed because it may read through all the SDI when first processing the program to be debugged.

Almost all programs are developed as collections of separate "source modules," each separately compiled. The output from each compilation is called an "object module"; it contains the translation of the program into machine language and, typically, the SDI generated for the source module. The object modules generated from all the source modules are combined into a single program by a program called a "linker." The combined output contains the SDI as well as all of the translated machine language.

The problem: there is a large quantity of redundant SDI in programs made of separately compiled source modules. This is because these separate source modules almost always share common source code of the program—placed in so-called "header files", and the SDI for a single header file shared by two different source modules is contained in both object modules.

With the relatively new language C++ rapidly growing in popularity, the problem is becoming worse, due to peculiar characteristics of the C++ language in which extensive program source code is contained in the header files. The industry has spent a lot of effort trying to reduce the redundancy. According to Eric Engstrom of Microsoft Corporation, over two man years was invested in a Microsoft program called 'CVPACK' (Codeview pack), which is a utility whose primary task is to remove redundancy from SDI. (Codeview is the name of Microsoft's debugger, and "Codeview records" is a term commonly used to describe the form of Microsoft's SDI.)

There is a need to reduce the generation of redundant SDI. This problem is primarily found in connection with C and C++ programs, although the problem can arise in connection with other languages as well.

The advantages of the reduction of the generation of redundant SDI are as follows:

saves space in program files;

speeds up debuggers because they can load less SDI;

speeds up the compilers that produce SDI, because they produce less redundant SDI.

DISCLOSURE OF INVENTION

In accordance with these and other features and advantages of the present invention, there may be provided a computing system which includes a compiler and a symbolic debugger that is used to debug a computer program written in high level language. The symbolic debugger is provided with symbolic debug information supplied from a compiler so as to permit the making of high level language inquiries. In operation, the compiler generates solely a single copy of symbolic debug information corresponding to a selected high level language construct having a specific name.

The compiling system associates a given name with the single copy of symbolic debug information that is derived from the specific name.

Thereafter, the computing system makes all references to the single copy of symbolic debug information by referring to that given name. The computing system employs standard linker technology to connect the references to the single copy of symbolic debug information.

Use of the present invention avoids the generation of redundant symbolic debug information, thereby saving space in program files, speeding up the symbolic debugger because it loads less symbolic debug information, and speeding up the compiler because it produces less redundant symbolic debug information. It also eliminates the necessity of removing redundantly generated SDI because none is generated.

BRIEF DESCRIPTION OF THE DRAWINGS

The various features and advantages of the present invention may be more readily understood with reference to the following detailed description of the preferred embodiments taken in conjunction with the accompanying drawings wherein like reference characters designate like elements.

DESCRIPTION OF THE PREFERRED EMBODIMENTS

The present invention comprises a process for reducing the generation of redundant SDI, as opposed to removing redundantly generated SDI. The present invention is extremely simple and can be implemented in many compilers and debuggers in a short time.

The CVPACK approach of Microsoft Corporation recognizes copies of redundant SDI and removes all but one copy. This approach may be called the "removal of redundant SDI" process. In contrast, the process of the present invention prevents the generation of redundant SDI in the first place—it may be called "non-generation of redundant SDI." The diagrams shown in FIG. 1 and in FIG. 2 illustrate the contrast. The diagrams show a common header file H, and three source modules A, B and C. Header file H is shared by all three source modules A, B and C, and contains language elements that require SDI.

The technique of the present invention makes it possible for only one of the three object modules A, B and C, to contain the SDI for the header file H—reducing the time for the compilation of modules B and C, and eliminating the need for removing redundant copies of SDI.

Figure 1:
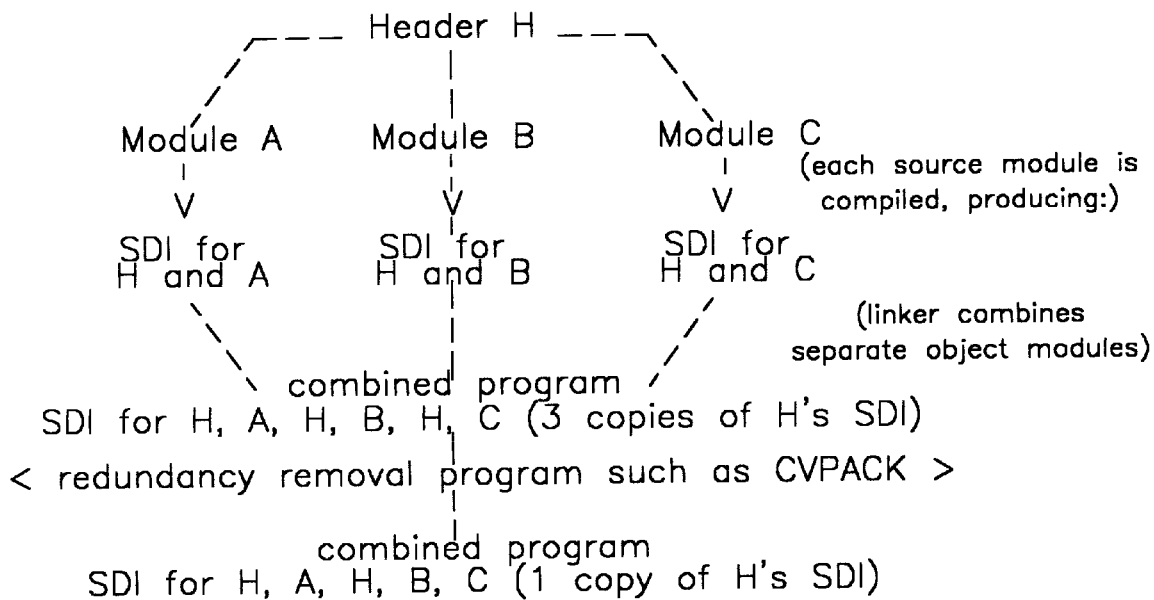
FIG. 1 is a diagram showing an existing method for removal of redundant SDI from a computer program.
Figure 2:
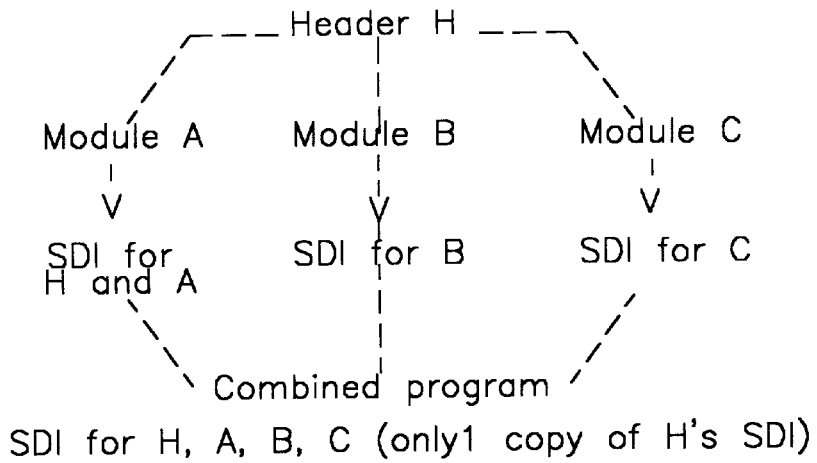
FIG 2 is a diagram illustrating the reduction of the generation of SDI in accordance with the present invention.

Referring now to FIG. 1, there is shown at the top of the diagram a Header H. The Header H is shared by three source modules, Module A, Module B, and Module C. Referring now to the right side of the diagram, each source module, Module A, Module B, and Module C, is compiled. This produces that which is shown in the diagram of FIG. 1 at the next level down. Below Module A is SDI for H and A; below Module B is SDI for H and B; and below Module C is SDI for H and C.

Referring again to the right side of the diagram, a linker combines the separate object modules. This produces that which is shown at the next level down of the diagram in FIG. 1. The combined program is SDI for H, A, H, B, H, C (3 copies of H's SDI).

Moving down one more level in the diagram shown in FIG. 1, there is applied a redundancy removal program such as CVPACK. The result is shown at the next level down. The combined program is now SDI for H, A, B, C (1 copy of H's SDI).

The foregoing process was the removal of redundant SDI approach as typically practiced in the prior art. Now, referring to FIG. 2, there is illustrated the non-generation of redundant SDI approach of the present invention.

As before, there is shown at the top of the diagram a Header H. The Header H is shared by three source modules, Module A, Module B, and Module C. By employing the present invention, below Module A appears SDI for H and A; below Module B appears SDI for B; and below Module C appears SDI for C. After the linker combines the separate object modules, the combined program is SDI for H, A, B, C (1 copy of H's SDI). Thus, no redundant SDI was created.

The following is a specific example of a two-source-module program and the behavior of Microsoft's 7.0 release C++ compiler in producing SDI. The source modules are called "1.cpp" and "2.cpp." They have a single shared header file called "dinfo.h".

If the two source modules 1.cpp and 2.cpp are compiled without SDI, the size of the output from the compiler is 1079 and 1010 bytes, respectively. When both source modules are compiled with SDI generation, the sizes are 3397 and 3270 bytes, respectively. The increase in sizes is due to the SDI; each object module is increased by the SDI for the shared header file dinfo.h and by the SDI for the source module itself.

When the two object modules are combined, the Microsoft CVPACK program reports that there is 3356 bytes of SDI before packing and 1944 afterwards. CVPACK eliminated one of the two copies of the SDI for dinfo.h.

By making use of the present invention, only one of the two object modules would have had SDI for the header dinfo.h. Contrast the Microsoft results with those produced by the present invention. In the foregoing example, without SDI, the compiler generates outputs of sizes 488 and 450 bytes. With SDI, a compiler embodying the invention generates outputs of sizes 4956 and 927 bytes. The SDI for dinfo.h is contained in the object module generated for 1.cpp.

The present invention applies to any SDI that describes a high-level language element or construct that is given a specific name unique across all source modules in the program. The programmer can—sometimes must—provide this specific name to the high level language construct. The name actually resides in the program source code itself. Such named elements or constructs occur frequently in C—and are ubiquitous in C++—and thus the present invention works well in those two languages.

The present invention makes use of standard linker technology. One of the fundamental tasks of a linker is to identify a reference to a named entity or high level language construct in one object module and locate the entity (by that name) in another object module.

SDI for a named high level language construct or element is generated for exactly one source module. In this object module, the SDI becomes a named entity whose name is related to the language element name.

In all other object modules that (absent this technique) would otherwise contain SDI for the same named language element, a reference to the named entity is instead generated.

In the combined program, there is thus by design a single copy of the SDI for this named language element. Furthermore, the linker relates the named references to the named entity in such a way that when the debugger is processing a source module whose object module contained a reference to the named entity, the debugger can find the SDI.

To state it another way, the present invention relates to an improvement in a computing system in which solely a single copy of symbolic debug information is generated for any selected high level language construct having a specific unique name. The computing system associates a given name with the single copy of symbolic debug information that is derived from the specific unique name.

From then on, the computing system makes all references to the single copy of symbolic debug information by referring only to that given name. The computing system employs standard linker technology to connect all references to the single copy of symbolic debug information.

The following represents an implementation of the present invention in two forms of SDI. The first is Microsoft's Codeview form and the second AT&T's-DWARF-form. The language used is C++.

Here is an abbreviated version of the source modules used in the foregoing example.

Shared header dinfo.h:

```
class streambuf {   // Excerpts from C + + streambuf class.
    public:
        void check_stat ();
        short priv_alloc, priv_unbuf;
        char* priv_base, priv_ebuf, priv_pbase, priv_pptr,
            priv_epptr, priv_gptr, priv_egptr, priv_eback;
        ~streambuf () {}
        streambuf(streambuf&);
        streambuf () {}
        streambuf(char*_buf, int_len);
    };
Module 1.cpp:
    #include "dinfo.h"
    streambuf b1;
    main () {}
Module 2.cpp:
    #include "dinfo.h"
    streambuf b2;
```

In this example, the named language element is the declaration of "class streambuf"; the name of the language element is "streambuf". All of the information between the { and } must be represented in the SDI for streambuf. This class declaration has a unique so-called "type" associated with it in C++. Program variables b1 and b2 are said to be "of that type" because they were declared with the name "streambuf". A debugger allows the programmer to inquire about the variables b1 and b2, and one kind of query relates to the streambuf "members" of b1 and b2—check_stat, priv_alloc, priv_unbuf, etc. For this the debugger needs to access the SDI for streambuf.

1. Microsoft Codeview Implementation.

The Microsoft Codeview information was extended to support shared SDI.

In the Codeview information contained in the object module generated for 1.cpp, a type number is assigned the class streambuf, and the variable b1 is associated with that type number. That is nothing new. Now comes the contribution in accordance with the present invention: a declaration of a compiler-generated variable called _type_ streambuf is created. The type of this variable is made to be the type of the class streambuf.

In the object module generated for 2.cpp, a new, special type is invented. This special type contains the name "streambuf" in its SDI and is essentially a communication to the debugger that says "look for some variable _type_ streambuf in the program; the type of that variable is the real type designated." This special type had to be added to the kinds of types normally present in the Codeview form of SDI.

Furthermore, a reference to _type_streambuf is generated that the linker will resolve to the declaration of _type_ streambuf in the object module for 1.cpp.

The variable b2 is associated with the type number for this special type. Thus, when a programmer asks the debugger to display, for example, the "priv_alloc" member of variable b2, the debugger first notices that b2 is of the special type. The debugger then looks instead at variable _type_ streambuf to find the true type of (and therefore SDI for) b2, at which point the SDI allows the debugger to figure out how to display the priv_alloc member.

When the present invention is implemented as a debugger product for MS-DOS, it does exactly this. The following is a textual representation of the significant portions of the object modules that show what has been done for the MS-DOS, implementation.

First, from the object module for 1.cpp:

```
2E5 PUBDEF GroupIx=2 "DGROUP" SegIx=3 "_BSS"
    "_type_streambuf" Offset=14 Codeview type=3
CD6: 3: struct: Size=A0(14) #members=37 Type-list=type#1
    Name-list=type#2
Tag="streambuf" unpacked
```

The first two lines show the variable _type_streambuf with type number 3. The last three lines show that type number 3 (3: ) is "streambuf" (Tag="streambuf").

From the object module for 2.cpp:

```
2B6 PUBDEF GroupIx=2 "DGROUP" SegIx=3 "_BSS"
    "b2" Offset=0 Codeview type=1
4: 1: list :    ?off=BD "streambuf"
1A4 EXTDEF
    3: "_type_streambuf" TypeIx=0
```

The first two lines show that variable b2 is of type 1 (type=1). The middle line shows that type 1 (1: ) is a special type, identified by the byte BD (hexadecimal). In that type is the name "streambuf". This tells the debugger to go look for _type_streambuf to find the true type for variable b2. The last two lines show the reference generated to the variable _type_streambuf (EXTDEF means "externally defined"—i.e., defined somewhere else; in this case, in the object module for 1.cpp).

2. DWARF Implementation

The DWARF implementation is somewhat simpler because the DWARF form of SDI needs no auxiliary variable _type_xxx created by the compiler, although we still make use of the name _type_xxx.

In the object module generated for 1.cpp, the DWARF SDI for class streambuf is given a public label _type_streambuf.

In the object module generated for 2.cpp, the type of variable b2 is made to be a reference to the label _type_streambuf. (Without this technique, it would instead be a reference to a label within 2.cpp's object module, and located at that label would be a repeat of the SDI for class streambuf.)

All of this works transparently to the debugger, because the linker causes the reference to refer to the public label _type_streambuf wherein lies the SDI the debugger needs. A copy of the SDI has been prevented from being generated in 2.cpp's object module, and instead that object module refers to the SDI in 1.cpp's object module. The nice feature of DWARF is that neither the debugger nor the form of the SDI was changed at all (unlike was necessary for Microsoft Codeview information, where a new, special type was invented, and the debugger was modified to recognize this special type).

The following is a textual representation of the significant portions of the object modules.

First, from the object module for 1.cpp:

```
.globl     _type_streambuf
_type_streambuf:
..T18:
..d13:
    .4byte    ..d13.e-         ..d13
    .2byte    19               # tag structure
    .2byte    0x12             # attr sibling, form .debug reference
    .4byte    ..d16
    .2byte    0x38             # attr name, form string
    .string   "streambuf"
    .2byte    0xb6             # attr byte_size, form 4bytes
    .4byte    20
..d13.e:
    ( ... etc. ... rest of SDI for class streambuf is omitted here)
```

The first two lines show that the DWARF SDI for type streambuf is labelled with public label _type_streambuf.

From the object module for 2.cpp:

```
    .2byte    7                # tag global - variable
    .2byte    0x12             # attr sibling, form .debug reference
    .4byte    ..d3
    .2byte    0x38             # attr name, form string
    .string   "b2"
    .2byte    0x72             # attr user_def_type, form .debug
                                 reference
    .4byte    _type_streambuf
    .2byte    0x23             # attr location, form block, 2-byte
                                 length
    .2byte    5;.byte          3;.4byte  b2
```

These lines show that the type of the variable b2 (.string "b2") is the type _type_streambuf (.4byte _type_streambuf). The linker causes this reference to refer to the public label in the first object module and the debugger is thus directed to that SDI.

3. Other Debug Formats.

Other popular SDI forms are DBX and SDB. For both of these a method similar to that which was used for Microsoft Codeview suffices.

Linker technology is essential to the implementation of the present invention. In DWARF references to types are connected to the definitions of types through linker resolution of label references. For the Codeview format, linker resolution of references to the _type_xxx variables ensures that the SDI is present for a referenced type. The debugger has to finish the connection of references to definitions by looking at the type for the variable _type_xxx.

The following is an example of how the foregoing principles are used to eliminate the generation of redundant SDI for a C++ runtime library. A C++ product offering typically provides a large number of library header files used by programmers writing C++ programs. In fact, the class streambuf is one of them. In a more realistic example, using the C++ class iostream, the sizes without and with SDI were, respectively, 1605 and 11330 bytes for the Microsoft 7.0 C++ compiler, and 903 and 20993 bytes for a compiler embodying the present invention.

In the compiler embodying the present invention, no compilation of a customer's source module will produce SDI for any of the named classes in the library header files. However, any program variable in a source module that has a type of one of those named classes is given that "special" type described in the Microsoft Codeview implementation above, and an external reference is generated to the __type__xxx variable for any type xxx used.

The compiler embodying the present invention was caused to generate the SDI for all the named classes in the library header files, and put all of this SDI in a single object module called "libdebug.obj" in the product's run-time libraries.

When the linker links a user's object modules, the run-time libraries are included as input to the linker. Any user's object module that contains a use of a library header file type xxx will contain a reference to a variable type __type__xxx. The linker will find all such variables in the libdebug.obj object module contained in the libraries, and will pull that object module out of the library and include it in the link (this is standard linker functionality). Thus, in accordance with the present invention, when the program is running, the debug information is made available to the debugger.

In this manner one copy of all the SDI for the named classes in the library header files is sure to be supplied, and it is not included in the user's program unless the program makes use of any of the named classes in the library header files.

Figure 3:
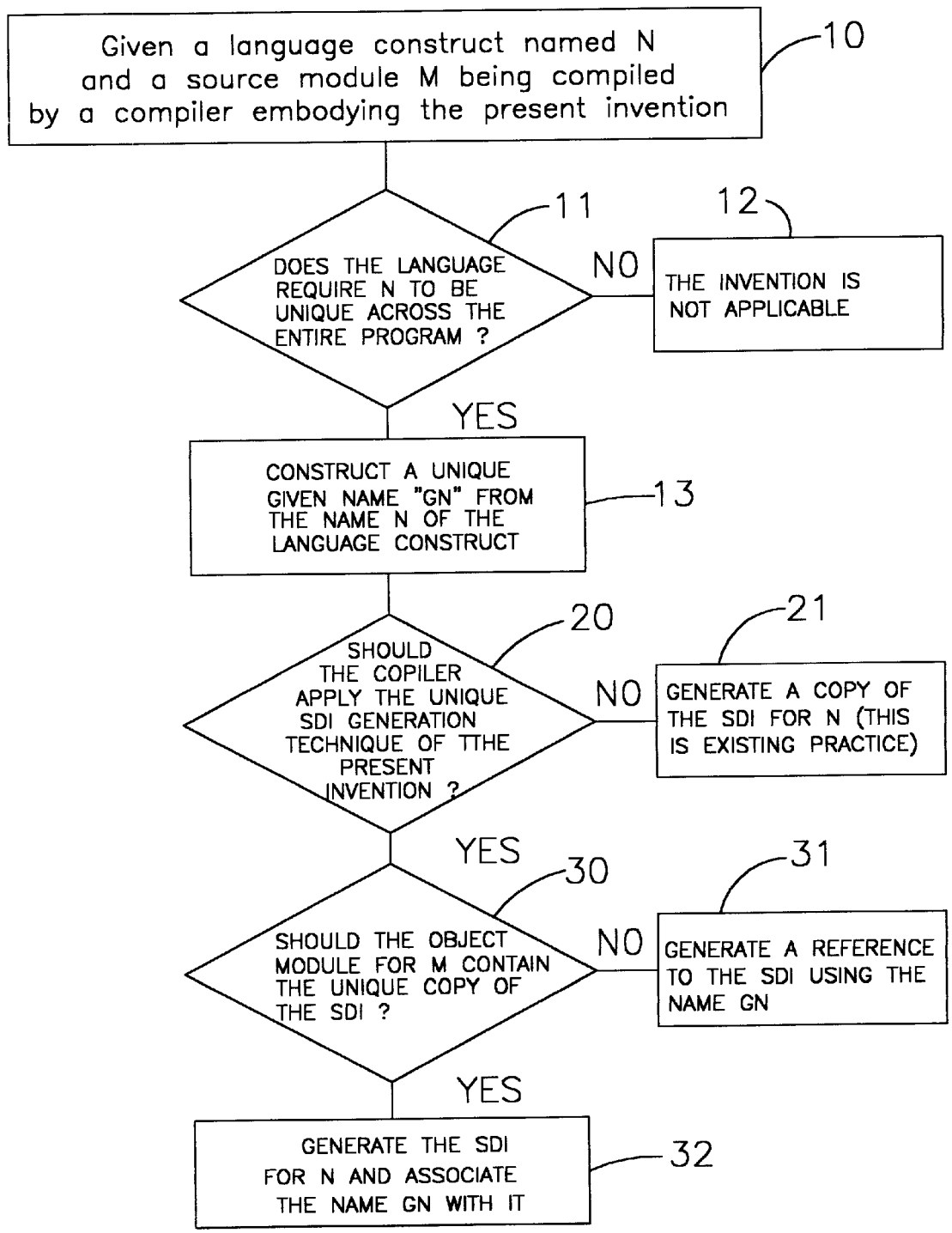
FIG. 3 is a flowchart illustrating the decision process in a compiler embodying the present invention.

Referring now to FIG. 3, there is shown a flowchart that illustrates the decision process in a compiler embodying the present invention. FIG. 3 indicates how a compiler embodying the present invention determines when to generate unique SDI for a named language construct. As indicated at box 10 at the top of the flowchart, the process begins with a given language construct named N and a source module M being compiled by a compiler embodying the present invention. The first decision box 11 asks whether the language requires N to be unique across the entire program. If the answer is no, then as indicated by box 12, the invention is not applicable. If the answer is yes, then the action shown by box 13 is to construct a unique given name "GN" from the name N of the language construct.

The next decision box 20 asks whether the compiler should apply the unique SDI generation technique of the present invention. If the answer is no, then as indicated by box 21, the conventional practice of generating a copy of the SDI for N is implemented. If the answer is yes, then the next decision box 30 asks whether the object module for M should contain the unique copy of the SDI. If the answer is no, then as indicated by box 31, the action required is to generate a reference to the SDI using the name GN. If the answer is yes, the action shown by box 32 is to generate the SDI for N and associate the name GN with it.

Figure 4:
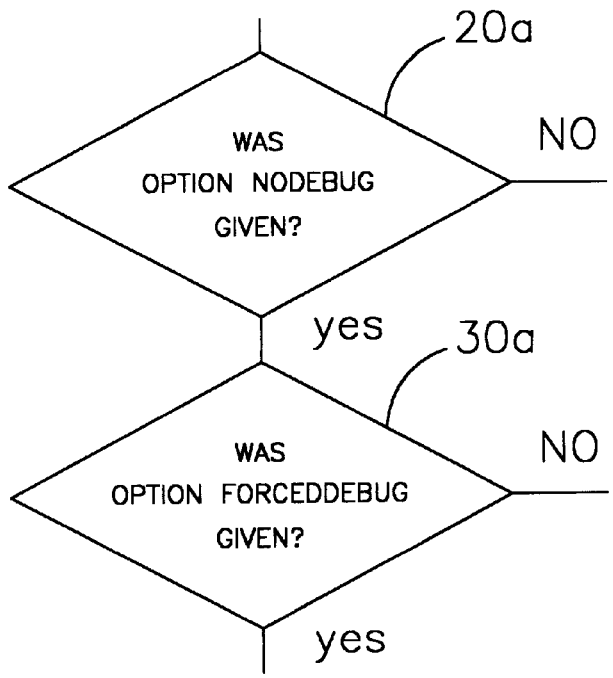
FIG. 4 is a flowchart illustrating a manual method of generating a unique SDI for a language construct named N.
Figure 5:
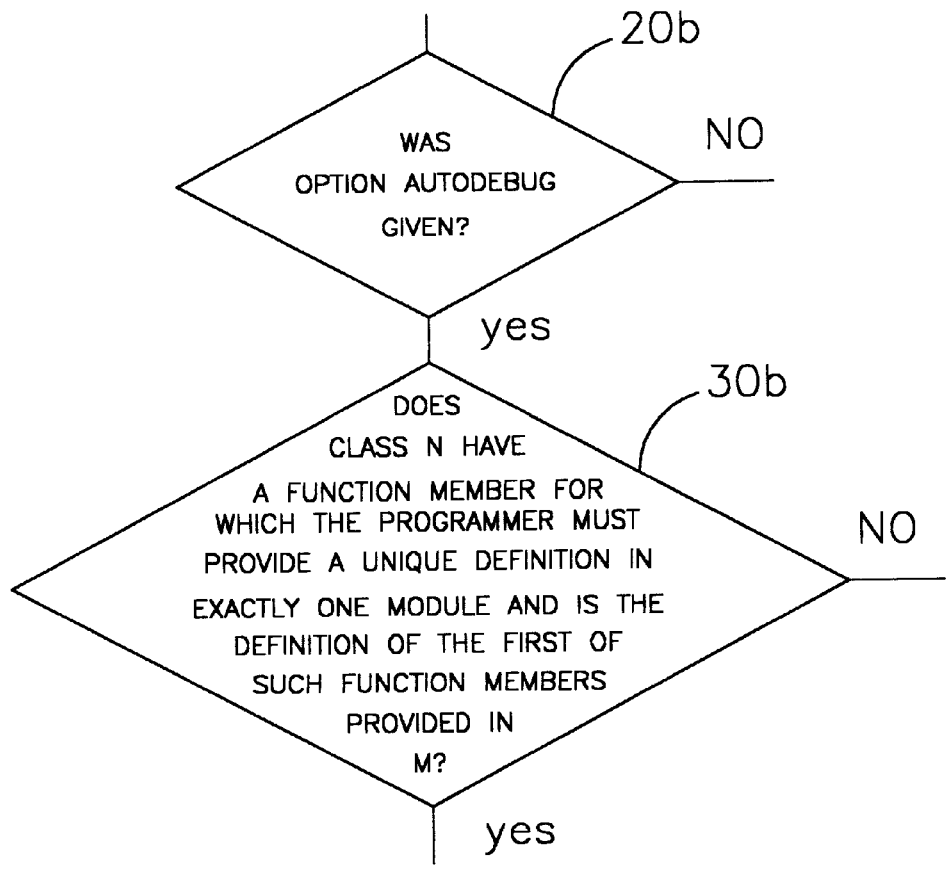
FIG. 5 is a flowchart illustrating an automatic method of generating unique SDI for a class named N in the language C++.

There are many specific ways of implementing the decisions in box 20 and box 30. Two ways are shown in FIG. 4 and FIG. 5. FIG. 4 is a flowchart illustrating a manual way of generating a unique SDI for a language construct named N. FIG. 5 is a flowchart illustrating an automatic method of generating unique SDI for a class named N in the language C++. It will be understood that boxes 20a and 30a in FIG. 4, and boxes 20b and 30b in FIG. 5 are to be inserted in FIG. 3 as replacements for box 20 and box 30. The manual and automatic methods are described below.

Identifying the Object Module to Contain SDI.

Identifying which object module to contain the single copy of particular SDI can be done in many ways. Several techniques are described hereinafter, but others can be easily found.

Such identification can be done manually by the programmer or, for some language elements, automatically.

First there is described the manual method that was used for the aforedescribed library header files. Then, there is described an automatic method that is somewhat less effective, but easier to use.

1. Manual Method.

Two compiler options are provided; the first is called "nodebug" and the second "forcedebug". For named class declarations compiled with nodebug alone, any use of those classes will produce an external reference to the type as described hereinabove in connection with source module 2.cpp.

For named class declarations compiled with nodebug AND forcedebug, the compiler will produce in the object module the SDI for the named class along with the declaration of the __type__xxx variable as described hereinabove in connection with source module 1.cpp.

This manual method was used for the aforedescribed library header files as follows. All of the library header files have the "nodebug" option in them. This means that no user's program will generate the SDI for any named classes in the library header files.

A single source module called libdebug.cpp is provided which includes all of the library header files. But when this source module is compiled, the option "forcedebug" is supplied. This forces the compiler to generate the debug information for all the library header file named classes, and put it in the object module libdebug.obj generated for libdebug.cpp.

2. Automatic Method.

For C++, many named classes contain so-called "functions" as members. For most of these functions, a C++ programmer is obliged to provide the definition for a function in exactly one source module. For named classes with the option "autodebug" provided, the compiler will produce the SDI for said named class in the object module containing the definition for the first function in the class for which the programmer is obliged to provide that definition.

For example, in class streambuf, the first function is check__stat( ), and according to C++ rules, the programmer needs to provide the definition for this function. With the "autodebug" option the compiler will produce the SDI for streambuf in the single source module containing the definition of check__stat( ), and define __type__xxx. In all other source modules that use the streambuf type, the compiler will instead make references to the __type__xxx, since these other modules do not contain the definition of check__stat( ).

The reason the automatic method is less effective than the manual method is that there may be some named classes that have no functions as members. For these the autodebug option doesn't apply and the SDI will be generated for them for all source modules sharing the named class. Thus, redundancy that would be eliminated by the manual method may be present in the automatic method.

Referring again to FIG. 4, the flowchart shown therein describes how the manual method is specifically applied in the context of the flowchart shown in FIG. 3. Box 20 and Box 30 of FIG. 3 are replaced by box 20a and box 30a of FIG. 4. Similarly, the flowchart shown in FIG. 5 describes how the automatic method is applied in the context of the flowchart in FIG. 3.

It is to be understood that the above-described embodiments are merely illustrative of some of the many specific embodiments which represent applications of the principles of the present invention. Clearly, numerous variations can be readily devised by those skilled in the art without departing from the scope of the invention.

What is claimed is:

1. A computer implemented process consisting of a series of steps performed by a computer for reducing the amount of symbolic debug information output from a compiler, said computer implemented process comprising the following steps:

generating solely a single copy of symbolic debug information corresponding to a selected high level language construct having a specific name;

associating with said single copy of symbolic debug information a given name that is derived from said specific name;

making references to said single copy of symbolic debug information by referring to said given name; and employing standard linker technology to connect said references to said single copy of symbolic debug information.

2. A computer implemented process for reducing redundant symbolic debug information in computer programs used in a computing system which includes a symbolic debugger that is used to debug a computer program written in high level language, the symbolic debugger being provided with symbolic debug information supplied from a compiler so as to permit the making of high level language inquiries, said computer implemented process comprising the following steps:

generating solely a single copy of symbolic debug information corresponding to a selected high level language construct having a specific name;

associating with said single copy of symbolic debug information a given name, said given name being derived from said specific name of said selected high level language construct;

locating said single copy of symbolic debug information in only one object module and associating said given name with said single copy of symbolic debug information in said object module;

locating references to said given name associated with said single copy of symbolic debug information into other object modules; and linking all references to said given name occurring in said other object modules to said single copy of symbolic debug information.

3. A computer implemented process for reducing redundant symbolic debug information in computer programs used in a computing system which includes a symbolic debugger that is used to debug a computer program written in high level language, the symbolic debugger being provided with symbolic debug information supplied from a compiler so as to permit the making of high level language inquiries, said computer implemented process comprising the following steps:

generating solely a single copy of symbolic debug information corresponding to a selected high level language construct having a specific name;

associating with said single copy of symbolic debug information a given name that is derived from said specific name;

making references to said single copy of symbolic debug information by referring to said given name; and employing standard linker technology to connect said references to said single copy of symbolic debug information.

4. A computer implemented process for reducing redundant symbolic debug information in computer programs used in a computing system of the type having a symbolic debugger, and having a compiler for supplying symbolic debug information to the symbolic debugger, said computer implemented process comprising the following steps:

generating solely a single copy of symbolic debug information corresponding to a selected high level language construct having a specific name;

locating in only one object module said single copy of symbolic debug information, said single copy of symbolic debug information corresponding to a named entity whose name is related to the name of said selected high level language construct in said object module;

locating a reference to said named entity in other object modules, so that in a combined program, there is solely a single copy of the symbolic debug information for said selected high level language construct;

said computing system employing standard linker technology one of whose fundamental tasks is to identify a reference to said named entity in one object module and locate said named entity by that name in another object module; and said linker elating said named references to said named entity in such a way that when said symbolic debugger is processing a source module whose object module contains a reference to the named entity, said symbolic debugger can find said symbolic debug information.

5. A computer implemented process for reducing redundant symbolic debug information in computer programs used in a computing system which includes a symbolic debugger that is used to debug a computer program having a plurality of source modules written in high level language, each of said source modules being separately compiled using a compiler, said source modules sharing common source code placed in header files, said compiler translating said source modules written in high level language into object modules written in machine language, said object modules translated from said source modules being combined into a single combined computer program by a linker program, said computer implemented process comprising the following steps:

said compiler associating a given name with a single copy of symbolic debug information in only one of said object modules;

said single combined computer program containing said single copy of symbolic debug information as well as the machine language of said object modules;

said single copy of symbolic debug information located in only one of said object modules having a given name related to the name of a named high level language construct;

locating a reference to said given name in all other of said object modules so that in said single combined computer program, there is solely a single copy of the symbolic debug information for said named high level language construct;

employing standard linker technology one of whose fundamental tasks is to identify a reference to said given name in one object module and locate said symbolic debug information by that name in another object module; and relating said named references to said given name in such a way that when said symbolic debugger is processing a source module whose object module contains a reference to said given name said symbolic debugger can find said symbolic debug information.

6. A computer implemented process for reducing redundant symbolic debug information in computer programs used in a computing system which includes a symbolic debugger that is used to debug a computer program written in high level language, the symbolic debugger being provided with symbolic debug information supplied from a compiler so as to permit the making of high level language inquiries, said computer implemented process comprising the following steps:

generating solely a single copy of symbolic debug information corresponding to a selected high level language construct having a specific name;

locating said single copy of symbolic debug information in only one source module to form an object module, said single copy of symbolic debug information corresponding to a named entity whose name is related to the name of said selected high level language construct in said object module;

generating a reference to said selected high level language construct in all other object modules, so that in a combined program, there is solely a single copy of the symbolic debug information for said selected high level language construct;

said computing system employing standard linker technology one of whose fundamental tasks is to identify a reference to said named entity in one object module and locate said named entity by that name in another object module; and said linker relating said named references to said named entity in such a way that when said symbolic debugger is processing a source module whose object module contains a reference to the named entity, said symbolic debugger can find said symbolic debug information.

* * * * *

UNITED STATES PATENT AND TRADEMARK OFFICE
CERTIFICATE OF CORRECTION

PATENT NO. : 6,178,547 B1
DATED : January 23, 2001
INVENTOR(S) : Tom Pennello

It is certified that error appears in the above-identified patent and that said Letters Patent is hereby corrected as shown below:

Column 12,
Line 22, after the word "linker", please delete "elating" and replace with -- relating --.

Signed and Sealed this

Tenth Day of May, 2005

JON W. DUDAS
*Director of the United States Patent and Trademark Office*